United States Patent [19]
Voelkl et al.

[11] 4,017,593
[45] Apr. 12, 1977

[54] MANUFACTURE OF SODIUM DITHIONITE

[75] Inventors: Erfried Voelkl, Frankenthal; Siegfried Schreiner, Ludwigshafen; Gerd Wunsch, Speyer; Volker Kiener; Rudi Waibel, both of Ludwigshafen; Hartwig Koester, Frankenthal, all of Germany

[73] Assignee: BASF Aktiengesellschaft, Ludwigshafen (Rhine), Germany

[22] Filed: Aug. 12, 1975

[21] Appl. No.: 603,856

[30] Foreign Application Priority Data

Sept. 5, 1974 Germany ............................ 2442418

[52] U.S. Cl. ................................................ 423/515
[51] Int. Cl.$^2$ .......................................... C01B 17/66
[58] Field of Search .................... 423/515; 252/188

[56] References Cited

UNITED STATES PATENTS

| 2,010,615 | 8/1935 | Vanderbilt et al. | 423/515 |
| 3,714,340 | 1/1973 | Fujiwara et al. | 423/515 |
| 3,917,807 | 11/1975 | Yasue et al. | 423/515 |

Primary Examiner—Earl C. Thomas
Attorney, Agent, or Firm—Johnston, Keil, Thompson & Shurtleff

[57] ABSTRACT

For the preparation of anhydrous sodium dithionite by the reaction of sulfur dioxide with sodium formate and caustic soda in the presence of organic solvents, sulfur dioxide is passed, together with the formate, into a liquid containing all of the caustic soda required for the reaction. This initial liquid may contain, in addition to the caustic soda, a portion of the sulfur dioxide or formate required for the reaction.

7 Claims, No Drawings

MANUFACTURE OF SODIUM DITHIONITE

The present invention relates to an improved process for the manufacture of anhydrous sodium dithionite by the formate method.

The synthesis of sodium dithionite by reduction of sodium bisulfite or sodium pyrosulfite with sodium formate has been known for a long time. The starting materials are generally sulfur dioxide, caustic soda and sodium formate or methyl formate. The reaction may be represented by the following equation:

$$NaOOCH + 2 SO_2 + NaOH \rightarrow Na_2S_2O_4 + CO_2 + H_2O \qquad 1.$$

The solvents used are generally alcohol-water mixtures, mainly methanol-water mixtures.

A large number of variations of this reaction has been proposed to improve the yield and purity of the sodium dithionite. They differ from each other merely in the use of different methods of reaction control (e.g., metering of the starting materials, temperature and pressure control, solvent selection) and provide dithionite yields of about 70% (based on $SO_2$) at purities of about 90%.

The large number of modified processes which have been proposed indicates difficulties which occur in this reaction, particularly when it is desired to achieve high yield and purity on an industrial scale.

Some of the problems particularly likely to occur when the process is carried out on an industrial scale are as follows:

1. The effect of the pH of the reaction medium on the reaction. The reaction takes place at an adequate rate only at pH's below 5; on the other hand, the dithionite formed is stable only at pH's above 4.
2. The reaction is carried out in a solvent in which the sodium dithionite formed is sparingly soluble, for example in alcohol-water mixtures. Since these starting materials are also relatively sparingly soluble in the solvents, the reaction proceeds in some zones in heterogeneous stages which cannot be adequately controlled by external influences such as temperature, metering and concentration. The reaction is therefore controlled by chance factors such as crystal size, nucleation and local proportions of components.

The proposal generally made to solve the problem mentioned under (1) above is to use an excess of sodium formate and to employ this as the initial substance at the commencement of the reaction. This produces a reaction medium which is well buffered against acid pH's and thus reduces the risk of the pH falling below 4, the critical pH for decomposition of sodium dithionite.

The difficulties mentioned under (2) above must be accepted in all prior art processes. These difficulties mean that the reaction system is readily affected by, say, faulty metering or other external influences such as stirring speed and the dimensions of the reactor. Even when all of the reaction parameters are strictly maintained, fluctuations are hardly avoidable, particularly as regards purity, stability and crystal size.

The difficulty of achieving good and reproducible results as regards yield, purity and crystal size, which is very important for the stability of sodium dithionite, becomes a serious problem when the reaction is to be carried out on an industrial scale, and makes continuous operation virtually impossible.

In general, the prior art processes are carried out with a 40 to 80% excess of formate over the stoichiometric amount, since the formate, which is present in equilibrium $$HCOO^- + H^+ \rightleftarrows HCOOH, \qquad (2)$$

is not only required as reactant but is also necessary as buffer system and, in addition, some of it is lost due to esterification to methyl formate according to the following equation:

$$HCOOH + CH_3OH \rightleftarrows HCOOCH_3 + H_2O \qquad (3)$$

For this reason, the process is generally carried out by including all of the formate required in the initial liquid at the commencement of the reaction in the form of aqueous alcoholic solutions and adding a mixture of sulfur dioxide and methanol and possibly the alkaline component also, e.g., caustic soda.

However, one process is known which deviates from these principles (German published application No. 2,019,628). In the said process, a mixture of $SO_2$ and methanol and a mixture of NaOH and NaOOCH are simultaneously passed into a volume of methanol. However, this process is very expensive when carried out on an industrial scale, since all of the starting materials must be metered and mixed throughout the reaction, this placing high requirements on the metering accuracy and mixing efficiency of the plant to avoid both temporal and spatial fluctuations in the pH. Furthermore, accurate metering of the NaOH/NaOOCH mixture is very difficult, since this mixture provides a homogeneous solution in the available water only at elevated temperatures, temperatures of 160° C being mentioned in the example.

It is an object of the present invention to provide a process for the manufacture of sodium dithionite by the formate method giving high yields of sodium dithionite at constant purity and crystal size of the product in a simpler procedure of an industrially more practicable nature without these results being subject to undue fluctuations of an uncontrollable kind.

We have found that this object of manufacturing anhydrous sodium dithionite by reacting sulfur dioxide with sodium formate and caustic soda in the presence of organic solvents and water is achieved by taking an initial volume of liquid containing all of the caustic soda required and, if desired, a portion of the formate required and a portion of the sulfur dioxide required and passing all or the residual amount of formate together with all or the residual amount of sulfur dioxide into said volume of liquid to effct reaction of the components.

In the process of the invention all of the alkaline component, i.e., caustic soda, is initially present in the volume of liquid together, if desired, with a portion of the formate and a portion of the sulfur dioxide. All or the remainder of the formate and all or the remainder of the sulfur dioxide are then passed into said volume of liquid. In general, the initial volume of liquid does not contain more than 70% of all of the formate required according to the above equation and not more than 50% of the total amount of sulfur dioxide required. The caustic soda and formate are conveniently used in the form of aqueous solutions, although it is possible to use them in the form of solutions in mixtures of water and water-miscible organic solvents. Particularly suitable organic solvents are alcohols, of which methanol and isopropyl alcohol are to be preferred for economic reasons, although N-methylpyrrolidone, dimethyl formamide and diethyl formamide may be used if desired.

When the process is to be carried out batchwise, it is advantageous to use an initial volume of liquid which contains only caustic soda or, where it is desired to use at least some of the formate in the form of methyl formate (e.g., the recycled methyl formate which necessarily occurs on working up the mother liquor), which to use an initial volume of liquid contains not only the caustic soda but also sodium formate produced by saponification of methyl formate. According to a preferred embodiment of the process of the invention the initial liquor consists of all of the caustic soda used in the form of a 45 to 50% aqueous solution and up to 70% of the formate, used in the form of methyl formate or of a 45 to 53% aqueous sodium formate solution. Into this mixture there is then passed the residual formate in the form of a 45 to 53% aqueous sodium formate solution together with 30 to 60% of the sulfur dioxide dissolved in methanol followed by the residual 40 to 70% of the sulfur dioxide, again dissolved in methanol. If methyl formate is used as a starting component, the caustic soda is used in an excess over that required according to equation (1) above, since caustic soda is required, of course, for the saponification of the methyl formate according to equation (3) above.

In general, the formate is used in an excess of up to 80% over the stoichiometric amount.

The proportions of methanol and water are such that when all of the reactants have been added, the ratio of methanol to water, by weight, is from 3 : 1 to 5.7 : 1. It may be said, as a general rule, that it is advantageous to use from 60 to 100 parts of sodium formate, from 28 to 32 parts of caustic soda, from 90 to 150 parts of water and from 360 to 600 parts of organic solvent for every 100 parts of sulfur dioxide, by weight. As may be seen from the above, metering of the residual formate is at a faster rate than that of the sulfur dioxide. The addition of the $SO_2$ is conveniently carried out over from 1 to 2 hours, during which process it is important that the pH does not fall below 3.8 to 4.0. It has also been found advantageous to allow the mixture to react for a period of from 1 to 3 times the time taken for metering the $SO_2$, on termination of said $SO_2$ addition, in order to complete the reaction. The addition and subsequent reaction are advantageously carried out at slightly elevated pressures of from 1.5 to 4 bars. The temperature is maintained at from 67° to 80° C during metering. Although the temperature may be kept at the same level during the subsequent reaction, it is advantageous to raise it by at least 5° C in order to accelerate the subsequent reaction. However, the temperature should not exceed 85° C to avoid dissociation of sodium dithionite already formed.

The process of the invention may be carried out continuously if desired. Basically, the same applies as stated above. In a first reaction stage, a mixture is continuously produced which contains 100% of the total caustic soda required and from 40 to 60% of formate and from 30 to 60% of sulfur dioxide, by weight. The reaction is continued in several stages arranged in a cascade, for example in a cascade of stirred vessels. Advantageously, the remaining amounts of sulfur dioxide and formate are added in a second and third stage, care being taken to ensure that the pH does not fall below 3.8. Advantageously, the pH in the second stage is from 5.2 to 4.5 and in the third stage from 4.8 to 4.2. On completion of metering, the reaction mixture is advantageously allowed to react further in one or two additional stages, in which the pH is maintained between 5.0 and 6.0. The average residence time over all of the metering stages is from about 0.5 to 2 hours and that over the subsequent reaction phase is from 1 to 3 times the average residence time over the metering phase, preferably from 1.5 to 6 hours.

Here again, it is important to control the reaction in such a manner that not all of the formate component is introduced at the commencement of the reaction but that it is introduced over a number of stages corresponding to the metering rate used in the batchwise process.

The process of the invention provides, compared with results obtained in prior art methods, great improvements as regards yield and purity of the dithionite. It is also possible to obtain larger crystals of sodium dithionite, this being an important factor affecting the stability and other properties (dust reduction). Another advantage of the present process is that the said improved results are readily reproducible, this indicating that the process is less sensitive to faults arising from chance factors such as the formation of crystal nuclei and the growth of the crystals. Thus yields of more than 83 to 91%, based on $SO_2$, are produced consistently, the purity of the product being always between 91 and 93.1%.

EXAMPLE 1

100 parts of sodium hydroxide dissolved in 100 parts of water are placed in a stirred reactor. To this there are then added, simultaneously over 20 minutes: 167 parts of sulfur dioxide dissolved in 950 parts of methanol and 190 parts of sodium formate dissolved in 169 parts of water. There are then added, again concurrently over 100 minutes: 167 parts of sulfur dioxide dissolved in 500 parts of methanol and 80 parts of sodium formate dissolved in 71 parts of water. The temperature was maintained at 76° C at a pressure of 1.8 bars. When the addition of the components is complete, the reaction mixture is maintained at 83° C for 2 hours at a pressure of 1.8 bars to complete the reaction.

Following filtration, washing with methanol and drying, there are obtained 380 parts of anhydrous sodium dithionite having a purity of 92%. The yield is 84%, based on sulfur dioxide.

EXAMPLE 2

120 parts of sodium formate and 90 parts of sodium hydroxide are placed in a stirred reactor in suspension in 150 parts of water and 360 parts of methanol. To this suspension there are added, over 10 minutes, 140 parts of sulfur dioxide and 430 parts of methanol through the same inlet. There are then added, over 50 minutes, the residual amounts of sulfur dioxide and methanol, these being 160 and 485 parts respectively. The temperature is maintained at 76°C and the pressure at from 1.5 to 2 bars.

Concurrently with the addition of sulfur dioxide and methanol there are added 120 parts of sodium formate dissolved in 135 parts of water, over 30 minutes.

The carbon dioxide formed during the reaction is withdrawn at such a rate that the pressure in the reactor remains at 2 bars. Following the addition of the components, the reaction mixture is maintained at 82° C for 2 hours to complete the reaction.

After filtering, washing with methanol and drying, there are obtained 350 parts of anhydrous sodium dithionite having a purity of 92.5%. The yield, based on sulfur dioxide, is 85%.

EXAMPLE 3

100 parts of sodium formate and 90 parts of sodium hydroxide are placed in a stirred reactor in suspension in 135 parts of water and 360 parts of methanol. To this suspension there are added, over 15 minutes, 140 parts of sulfur dioxide and 430 parts of methanol at a temperature of 75° C and a pressure of 3.6 bars, through the same tube, the residual amounts of sulfur dioxide and methanol, 160 and 485 parts respectively, are then added over 45 minutes.

Concurrently with the addition of sulfur dioxide and methanol there are added 140 parts of sodium formate dissolved in 150 parts of water, over 30 minutes. The carbon dioxide formed during the reaction is withdrawn at such a rate that the pressure in the reactor is 2.8 bars. The temperature is 75° C.

On completion of the addition, the reaction mixture is maintained at 82° C for 150 minutes to complete the reaction.

After filtering, washing with methanol and drying, there are obtained 348 parts of anhydrous sodium dithionite having a purity of 93.1%. The yield, based on sulfur dioxide, is 85%.

EXAMPLE 4

120 parts of sodium formate and 90 parts of sodium hydroxide are suspended in 218 parts of water, 303 parts of methanol and 150 parts of isopropanol.

There are then added 140 parts of sulfur dioxide together with 284 parts of methanol and 143 parts of isopropanol, over 10 minutes. A further 160 parts of sulfur dioxide are then metered to the mixture together with 324 parts of methanol and 164 parts of isopropanol, over 50 minutes.

Concurrently with the addition of sulfur dioxide and alcohol there are added, over 30 minutes, 120 parts of sodium formate in 135 parts of water. The temperature is 77° C during the addition phase.

To complete the reaction, the reaction mixture is stirred at 81° C for 3.5 hours. After filtering, washing with methanol and drying, there are obtained 357 parts of anhydrous 93% sodium dithionite. The yield, based on sulfur dioxide, is 87%.

EXAMPLE 5

110 parts of sodium formate and 90 parts of sodium hydroxide are suspended in 140 parts of water, 270 parts of methanol and 90 parts of N-methylpyrrolidone.

There are then introduced, over 10 minutes, 140 parts of sulfur dioxide together with 323 parts of methanol and 107 parts of N-methylpyrrolidone. Over the next 50 minutes there are added the residual amounts of sulfur dioxide, methanol and N-methylpyrrolidone, these being 160, 364 and 121 parts, respectively.

Concurrently with the addition of sulfur dioxide and alcohol there are added, over 45 minutes, 130 parts of sodium formate in 145 parts of water. During this addition phase, the temperature is 74° C at a pressure of 3.0 bars.

The reaction is then completed by boiling under reflux at 83° C for 2 hours.

After filtering, washing with methanol and drying, there are obtained 374 parts of anhydrous 91% sodium dithionite. The yield, based on sulfur dioxide, is 91%.

EXAMPLE 6

To the first stage of a continuous cascade of stirred vessels, there are added, at 76° C, per hour, 90 parts of sodium hydroxide dissolved in 90 parts of water, 120 parts of sodium formate dissolved in 110 parts of water and 150 parts of sulfur dioxide dissolved in 700 parts of methanol. The inlets for the three solutions are situated at different points and the pipelines and metering equipment for the caustic soda and formate solution are heated. The average residence time in this first stage is 15 minutes and the temperature is 76° C. In this stage the pH is from 4.6 to 5.4.

In a second stage, there are added to the mixture produced in the first stage at 76° C, per hour, 80 parts of sodium formate dissolved in 71 parts of water and 90 parts of sulfur dioxide dissolved in 250 parts of methanol, this giving a pH of 4.5 to 4.7. The average residence time in this stage is 25 minutes.

In the third stage, 40 parts of sodium formate dissolved in 35.5 parts of water and 60 parts of sulfur dioxide dissolved in 300 parts of methanol are added, per hour, at 76° C. This gives a pH of from 4.2 to 4.5. The average residence time in this stage is 20 minutes.

To complete the reaction at a temperature of 83° C, the reaction mixture passes, without further additions, to fourth and fifth stages, in which the residence time is altogether 150 minutes. The pH's obtained are from 5.0 to 5.4 in the fourth stage and from 5.3 to 5.6 in the fifth stage.

The carbon dioxide formed during the reaction is withdrawn at such a rate that the pressure in the cascade is always at 2 atmospheres.

There are obtained 340 parts per hour of anhydrous sodium dithionite from the suspension discharged from the fifth stage, after filtration, washing with methanol and drying. This is equivalent to a yield of 82.5%, based on $SO_2$. The sodium dithionite content of the product is 92.5%.

The resulting mother liquor is acidified, for example with sulfuric acid, and then worked up by distillation to give sulfur dioxide, methyl formate and methanol.

In all of the above Examples parts are by weight.

We claim:

1. A process for the manufacture of anhydrous sodium dithionite by the reaction of sodium formate, sulfur dioxide and caustic soda which comprises adding to an initial volume of a liquid mixture of an organic solvent and water having dissolved therein all of the caustic soda required for the reaction and not more than 70% of all of the formate required, adding together the remainder of the sodium formate and the sulfur dioxide at temperatures in the range of 67° to 80° C., reacting the formate, sulfur dioxide and caustic soda at 67° to 85°C., and separating the anhydrous sodium dithionite formed from the liquid phase.

2. A process according to claim 1, wherein the initial volume of liquid also contains a portion of the formate required for the reaction and a portion of the sulfur dioxide required for the reaction.

3. A process according to claim 1, wherein the reaction is carried out at a pressure of from 1.5 to 4 bars.

4. A process according to claim 1, wherein the reaction mixture is allowed to react further after all of the formate and sulfur dioxide has been added, said further reaction being carried out at temperatures of from 67° to 85° C and being allowed to continue for a period of from 1 to 3 times the time required to introduce the sulfur dioxide.

5. A process for the production of anhydrous sodium dithionite by the reaction of sodium formate, sulfur dioxide and caustic soda which comprises metering all of the caustic soda solution required and from 20 to 50% by weight of the sodium formate and from 20 to 60% by weight of the sulfur dioxide to a first stage, the introduction of the remainder of the sulfur dioxide and sodium formate taking place in at least one further state in such a manner that the pH does not fall below 3.8, and reacting the formate, sulfur dioxide and caustic soda at 67° to 85° C.

6. A process as claimed in claim 5, wherein the addition is carried out in two stages, provided that the pH in the first stage is maintained at from 5.2 to 4.5 and the pH in the second stage is held at from 4.8 to 4.2.

7. A process as claimed in claim 6, wherein the reaction mixture is allowed, after addition of all of the sulfur dioxide and all of the sodium formate, to react at 67°–85° C to completion, with agitation, in at least one subsequent stage.

* * * * *